United States Patent Office 2,800,874
Patented July 30, 1957

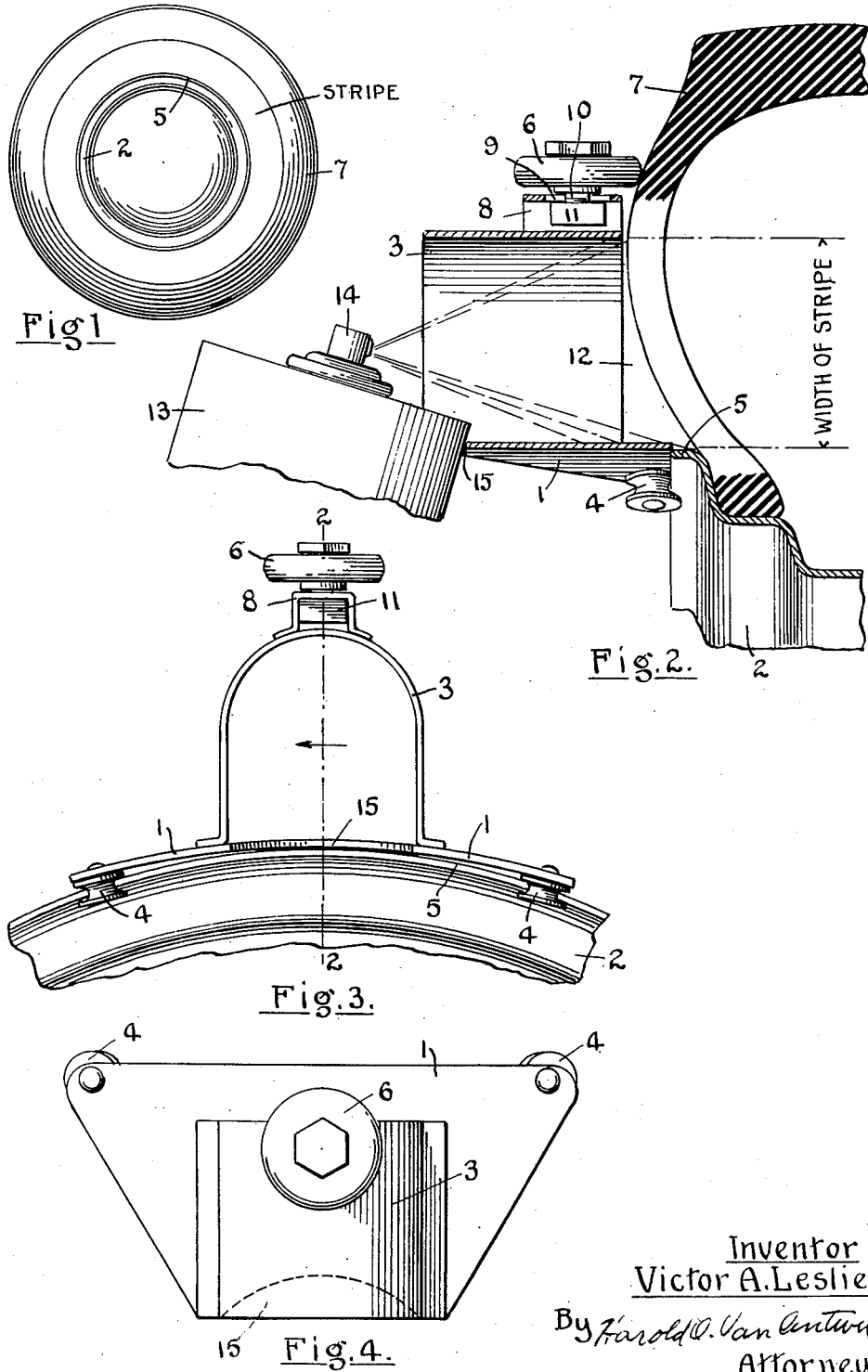

2,800,874

TIRE PAINTING DEVICE

Victor A. Leslie, Grand Rapids, Mich.

Application September 28, 1953, Serial No. 382,573

6 Claims. (Cl. 118—301)

This invention provides a device specifically designed for the purpose of painting a relatively wide white annular stripe on the side wall of an automobile tire adjacent the rim to give the popular white side wall effect. This application is a continuation in part of application Serial No. 249,124, filed October 1, 1951, now abandoned.

White side wall tires were customarily made by molding the side walls of white rubber but these cost considerably more than the conventional all black rubber tires and it was found that the effect or appearance could be simulated by painting the white annular stripe up on the less expensive black tires.

In the past this painting the side wall was done by applying a suitable paint with a brush and this method is still carried out extensively. But this painting method is unsatisfactory for several reasons. The work is usually done by the automobile owner or a garage mechanic, neither of whom is an expert at wielding the brush. It was a long tedious job and the paint would not be evenly distributed. The dividing line between the painted stripe and the black portion of the tire would be uneven. The paint would be smeared upon the rim of the wheel and the result would be a messy job, which showed at a glance that it was hand painted and not a white rubber inlay which it was intended to simulate.

The present invention provides a device by the use of which an amateur or layman may produce a white annular stripe on the side wall of a tire with a clean cut dividing line so perfect in appearance that it requires close scrutiny to discern that it is not a factory built white side wall.

The device of this invention for accomplishing the above result is in the nature of a hand manipulated guard, open at both ends and provided at its lower side with two laterally spaced guides such as grooved rollers which are adapted to run on the bead of the wheel rim and at its top side is a guide, preferably a roller, which runs against the side of the tire outside the painted area and is located to guide the top of the guard close to but out of contact with the side of the tire. The lower side of the guard, at its opening adjacent the tire, runs close to the bead of the rim.

In use, the wheel on which is the tire to be painted is jacked up so that it will turn freely and is rotated slowly. The guard is held in position by one hand of the operator with its lower spaced roller guides running on the rim bead and the upper roller guide running against the tire. The paint is sprayed through the guard against that part of the revolving tire which is exposed through the open end of the guard adjacent the tire. The paint is sprayed continuously while the tire rotates and the tire may be rotated as many times for a painting operation as is desired to give the desired thickness of the painted stripe.

For spraying the paint any suitable paint spraying device having a movable nozzle may be used, but for most practicability, it is intended to use the type of small paint container having a spray nozzle attached and containing paint under pressure. Such paint spray cans are now in common use, known in the trade as "Aerosol" cans, and this applicant has developed a particular paint suitable for this purpose and adaptable for use in such a pressurized can.

It is desirable that the spray nozzle be movable relative to the guard while the painting is being done so that the spray may be directed upwardly and downwardly to completely cover the painted area.

The outfit consisting of the guard and pressurized spray can of paint may be purchased cheaply by the automobile owner who can thereby paint his tires with a white side wall at a fraction of the cost of white rubber side walls and when the painted area becomes scuffed and dirty he may quickly repaint them. Furthermore, he can if desired, use other colors than white so that the color of the tires may be made to harmonize with the color of the car body.

The terms "upper," "lower," "top" and "bottom" are used relatively herein for brevity and clearness of description, and because the guard is usually held against the tire with the spaced rollers against the rim below the roller which rides on the tire, that part of the guard having the spaced rollers will be considered at the lower or bottom side while the single roller will be at the upper or top side.

The invention is hereafter more fully described and particularly pointed out in the claims, reference being had to the accompanying drawing in which:

Fig. 1 is a reduced size side elevation of an automobile wheel with a tire thereon and showing the painted side wall.

Fig. 2 is a transverse vertical section with parts broken away showing the device of this invention operatively applied to a rim and tire.

Fig. 3 is an end elevation of the device, and

Fig. 4 is a plan view of the same.

Like reference numbers apply to like parts in all of the figures.

The device has a bottom plate 1 curved on approximately the same radius as the rim 2 of the wheel. Centrally located on the upper side of plate 1 is a guard 3 open at both its front and rear ends. On the under side of the plate 1 and spaced at opposite sides of the vertical center of the guard are grooved rollers 4 adapted to embrace and run upon the outwardly projecting bead 5 at the periphery of the wheel rim 2.

On the upper side of the guard at its center is located a guide roller 6 adapted to run against the outer side of the tire 7 and positioned to guide the upper side of the guide at its end adjacent the tire close to but out of contact with the tire. This roller 6 may be adjustably mounted in a fixture 8 having a slot 9 through which the axis bolt 10 of the roller extends, said axis bolt being threaded into a nut 11 slidably mounted in the fixture 8. By this mounting, the roller 6 may be adjusted in or out in conformity with the curvature of the tire wall so that the upper edge of the guard will run close to but out of contact with the tire. This feature of the device is important because it is the upper edge of the guard that defines the edge of the stripe.

The inner edge of the plate 1 is guided by the rollers 4 to extend close to and preferably outside of the rim bead 5. The inner edge of the guard 3, below its top portion, is spaced considerably away from the tire providing a clearance 12. This clearance is desirable because the curvature of the side wall of the tire varies considerably in different makes of tires and the clearance at 12 accommodates this variation without interfering with the close proximity of the upper part of the guard with the tire.

In operation, the painting is done with the tire on the wheel rim. The wheel is jacked up so that it will turn freely and is rotated slowly. The guard is held in one hand of the operator with the two lower guide rollers 4 running on the bead 5 of the rim 2 and the guide roller 6 running against the side of the tire 7 outside the area to be painted.

In this position, and with the tire slowly rotating a spray can of paint 13 is held by the other hand of the operator and its nozzle 14 is directed to spray the paint through the guard 3 against that portion of the tire which is exposed through the open inner end of the guard. The plate 1 prevents the paint from striking the rim of the wheel and the height of the guard opening defines the width of the stripe. The upper portion of the guard being located close to the side of the tire accurately defines the dividing line between the painted stripe and the black portion of the tire. The guide rollers 4 and 6 prevent any portion of the guard from touching the tire within the painted area or closely adjacent to it so that smearing of the paint is prevented. The grooved rollers 4 embracing the bead cause the guard to travel in a true annular path.

The three point guiding contact of the lower rollers 4 and the upper roller 6 prevent "wobbling" of the guard which would interfere with the accuracy of the work and permit the guard to strike the painted area.

It is desirable, though not necessary, that the guides 4 and 6 be rollers because they make for more easy and smooth running of the guard and usually the tire has embossed lettering upon its side wall over which the roller 6 runs more easily.

To aid in locating the position of the spray can an indenture 15 may be provided in the outer edge of the bottom plate 1 into which the can may be located. When so located, the can may be moved to direct the spray up and down within the guard to insure an even coverage of paint on the tire within the guarded area.

By use of this device, an ordinary black tire may be converted to a so called white side wall easily and quickly by a novice, the actual painting time required, after the wheel is jacked up for rotation, being not more than one minute per tire. The result is a clean cut, well defined annular stripe of paint on the side wall of the tire having a close resemblance to the factory built white rubber inlays.

This result is made possible by guiding the guard accurately as the tire rotates so that it does not wobble, the bottom of the guard shielding the wheel rim and the top of the guard running close to the tire with all parts of the guard out of contact with the painted area. Furthermore, the grooved guide rollers running on the circular bead of the rim insure that the guard follows a true circular path with respect to the tire.

If a spot of the painted surface should become scuffed in service, it is not necessary to jack up the wheel and repaint the whole stripe to remove the spot but the guard may be placed in position on the stationary wheel and moved back and forth past the spot while the paint is being sprayed.

The invention is defined in the appended claims which are to be considered comprehensive of all forms coming within their scope.

I claim:

1. A device for painting an annular stripe on the sidewall of a tire mounted on a wheel rim having an outwardly projecting bead comprising a tubular guard applicable to said tire and rim and having inner and outer portions spaced apart radially of the axis of the tire and said guard having open opposite ends adjacent to and remote from the tire respectively, a first guide means comprising spaced apart guide elements disposed respectively at opposite sides of the guard on its inner portion adapted to embrace and run upon said bead, a second guide means on the outer portion of the guard adapted to engage and run upon the side of the tire and located to position the outer portion of the guard close to but out of contact with the side of the tire, said guides acting to form a three point contact with the rim and tire, the open end of the guard adjacent the tire defining the radial width of the stripe to be painted, and all of said guides being outside the area exposed through the open end of the guard, and means for spraying paint through said guard onto the part of the tire exposed through said open end adjacent the tire while the tire is rotated relative to the guard.

2. The elements of claim 1 in which the said first guides are located toward the axis of the tire relative to the inner portion of the guard and are located to hold the bottom of the guard in a position to shield the wheel rim from paint sprayed through the guard.

3. The elements of claim 1 in which said second guide is adjustable on the guard in a direction to and from the tire.

4. The elements of claim 1 in which said means for spraying paint comprises a spray nozzle which may be directed upwardly and downwardly through the guard during the painting operation.

5. A device for painting an annular stripe on the side of a tire mounted on a wheel rim having an outwardly projecting annular bead comprising, a tubular guard applicable to said tire and rim and having inner and outer portions spaced apart radially of the axis of the tire and said guard having open opposite ends adjacent to and remote from the tire respectively, inner and outer guide means mounted respectively on said inner and outer portions of the guard close to the open end adjacent the tire, said outer guide means traversably engaging the tire and said inner guide means traversably engaging said bead, both being outside the area of the open end of the guard adjacent the tire and acting to accurately space said open end of the guard close to but out of contact with the tire, and spray means located adjacent the open end of the guard remote from the tire and acting to direct a spray of paint through said guard onto said tire adjacent said bead in a well defined annular stripe as the tire is rotated relative to the guard.

6. The elements of claim 5 in which said spray means includes a nozzle which may be moved to direct the spray therefrom at various angles through the guard.

References Cited in the file of this patent
UNITED STATES PATENTS

| | | |
|---|---|---|
| 1,927,743 | Ivey | Sept. 19, 1933 |
| 2,119,043 | Corneilson | May 31, 1938 |
| 2,476,299 | Hirsh | July 19, 1949 |
| 2,512,542 | Goda | June 20, 1950 |
| 2,647,793 | Mosher | Aug. 4, 1953 |
| 2,658,714 | Fooshee | Nov. 10, 1953 |